United States Patent
Bisson et al.

(10) Patent No.: US 7,611,184 B1
(45) Date of Patent: Nov. 3, 2009

(54) VEHICULAR TRUNK-THROUGH OPENABLE AND CLOSABLE DEVICE

(75) Inventors: Mark Anthony Bisson, Pataskala, OH (US); Corey James Kracht, Westerville, OH (US)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 12/167,354

(22) Filed: Jul. 3, 2008

(51) Int. Cl.
*B60R 7/04* (2006.01)
(52) U.S. Cl. ............... 296/37.16; 296/37.8; 296/37.15
(58) Field of Classification Search ............ 296/37.8, 296/37.14, 37.15, 37.16, 24.3; 297/188.04, 297/188.06, 188.07
See application file for complete search history.

(56) References Cited

U.S. PATENT DOCUMENTS

| | | | | |
|---|---|---|---|---|
| 6,398,284 B1 * | 6/2002 | Butz et al. | ............... | 296/37.15 |
| 6,550,849 B1 * | 4/2003 | Dosdall | ................ | 296/37.15 |
| 2002/0030376 A1 * | 3/2002 | Butz et al. | ............... | 296/37.15 |
| 2007/0296236 A1 * | 12/2007 | Sitzler et al. | ............... | 296/37.8 |

FOREIGN PATENT DOCUMENTS

JP 59-190635 U 12/1984

\* cited by examiner

*Primary Examiner*—Lori L Lyjak
(74) *Attorney, Agent, or Firm*—Darby & Darby P.C.

(57) ABSTRACT

A vehicular trunk-through openable and closable device (5) whose unlocked condition can be more easily checked than has conventionally been done. When releasing a locked condition of an opening and closing unit (11) using an unlocking unit (12), the unit (11) is rotated in a forward-folding direction by an elastic force caused by an elastic member (30). A gap is formed between the unit (11) and a trunk-through section (3) without bringing the unit (11) into a fully open condition. Hence, it can be visually checked whether the gap has been formed between the unit (11) and the trunk-through section (3) or not, thus enabling a user to instantly determine whether the locked condition has been released by the unlocking unit (12). Thus, an unlocked condition of the vehicular trunk-through openable and closable device (5) can be much more easily checked than has been conventionally done.

5 Claims, 11 Drawing Sheets

VEHICULAR TRUNK-THROUGH OPENABLE AND CLOSABLE DEVICE

FIELD OF THE INVENTION

The present invention relates to a vehicular trunk-through openable and closable device, which can be suitably applied to the one used, e.g., for allowing a trunk room and a vehicle interior to communicate with each other inside a vehicle.

DESCRIPTION OF THE RELATED ART

Heretofore, there has been provided a trunk-through type rear seat in a vehicle, in which when a long object such as a ski or the like is taken in a trunk room of the vehicle, a rear trunk room and a forehand vehicle interior are allowed to communicate with each other by folding a seat back of a rear seat forward and thus the long object comes to be capable of being loaded across the trunk room and the vehicle interior. A locking device provided with a push button is provided in the trunk-through type rear seat. When folding the rear seat forward, the push button is first pressed, as an operation for opening the trunk room, and thus a locking member of the seat back locked to a vehicle body in a standing condition is unlocked, and then, the seat back is grasped as it is with user's own hands to be folded forward, as shown in, e.g., Japanese Un-examined utility model application publication No. 59-190635 (see FIG. 1).

According to the conventional locking device, however, the locking device is provided at a position where it is not directly visible to a user. Therefore, there has been a problem that even if the locking member is unlocked from a vehicle body, it is impossible for the user to make it sure that the locking member of the seat back has actually been unlocked from the vehicle body, unless a user actually tries to fold the seat back forward with his/her own hands.

SUMMARY OF THE INVENTION

The present invention has been made in view of the problem described above. Accordingly, it is an object of the present invention to provide a vehicular trunk-through openable and closable device in which its unlocked condition can be checked much more easily than has conventionally been done.

According to a first aspect of the present invention, there is provided a vehicular trunk-through openable and closable device, comprising:

an opening and closing unit rotatably provided in a trunk-through section for allowing a trunk room and a vehicle interior to communicate with each other to open and close said trunk-through section;

a locking unit for locking said opening and closing unit in a closed condition in said trunk-through section; and an unlocking unit for unlocking a locked condition caused by said locking unit, wherein said opening and closing unit is provided with an elastic member, said elastic member allowing said opening and closing unit to rotate in an opening direction by an elastic force thereof when said locked condition caused by said locking unit is unlocked by said unlocking unit, thus forming a gap between said opening and closing unit and said trunk-through section without bringing said opening and closing unit into a fully open condition.

A second aspect of the present invention is a vehicular trunk-through openable and closable device in which said opening and closing unit includes a rotating section rotatably provided in a lower portion of said trunk-through section; said locking unit locks said opening and closing unit in a standing condition; and said elastic member applies said elastic force to said opening and closing unit in a forward-folding direction.

A third aspect of the present invention is a vehicular trunk-through openable and closable device in which the elastic member is sheet-shaped and is extended in a tensioned condition so as to wind around a mounting support column provided in a given position when said opening and closing unit is in a closed condition, thereby applying said elastic force to said opening and closing unit in a forward-folding direction.

A fourth aspect of the present invention is a vehicular trunk-through openable and closable unit in which said mounting support column extends in a vehicular transverse direction and is pushed into a space between a turned-back end of said rotating section and a surface opposed thereto so that said elastic member is extended in a tensioned condition by said mounting support column while said turned-back end is fixed to said mounting support column with fixing pins.

A fifth aspect of the present invention is a vehicular trunk-through openable and closable device in which a degree of tensioning caused by said mounting support column is adjusted in said elastic member so that a forward-folding rotating force applied to said opening and closing unit by said elastic force becomes slightly larger than a force applied thereto toward a standing direction by an own weight of said opening and closing unit, and thus once said locked condition caused by said locking unit has been unlocked by said unlocking unit, said opening and closing unit is rotated in said forward-folding direction by said elastic force until said opening and closing unit has been rotated up to a given angle at which the own weight of said opening and closing unit and said elastic force are well balanced to thereby regulate a rotating degree of said opening and closing unit.

According to the first aspect of the present invention, it can be visually checked whether the gap is formed between the opening and closing unit and the trunk-through section, thus enabling a user to instantly determine whether the locked condition of the opening and closing unit has been unlocked by the unlocking unit or not. Hence, there can be provided a vehicular trunk-through openable and closable device in which the unlocked condition can be much more easily checked than has conventionally been done.

According to the second aspect of the present invention, the rotating degree of the opening and closing unit can be regulated at a given angle and thus a slight gap can be formed in an upper region of the opening and closing unit and trunk-through section. Hence, it can be easily visually checked by a user performing such visual checking from above whether the gap has been formed or not.

According to the third aspect of the present invention, the elastic member can be thinned. Hence, the elastic member can be easily mounted even in rear portions of the rear seat where a mounting space is comparatively small.

According to the fourth and fifth aspects of the present invention, the elastic member can be thinned with certainty.

According to the fifth aspect of the present invention, the gap can be formed reliably between the opening and closing unit and the trunk-through section.

BRIEF DESCRIPTION OF THE DRAWINGS

The foregoing object and other objects and advantages of the present invention will become more apparent upon reading of the following detailed description and the accompanying drawings in which.

DETAILED DESCRIPTION OF THE PREFERRED EMBODIMENT

Hereunder is a detailed description of one embodiment of the present invention with reference to the accompanying drawings.

Figure 1:
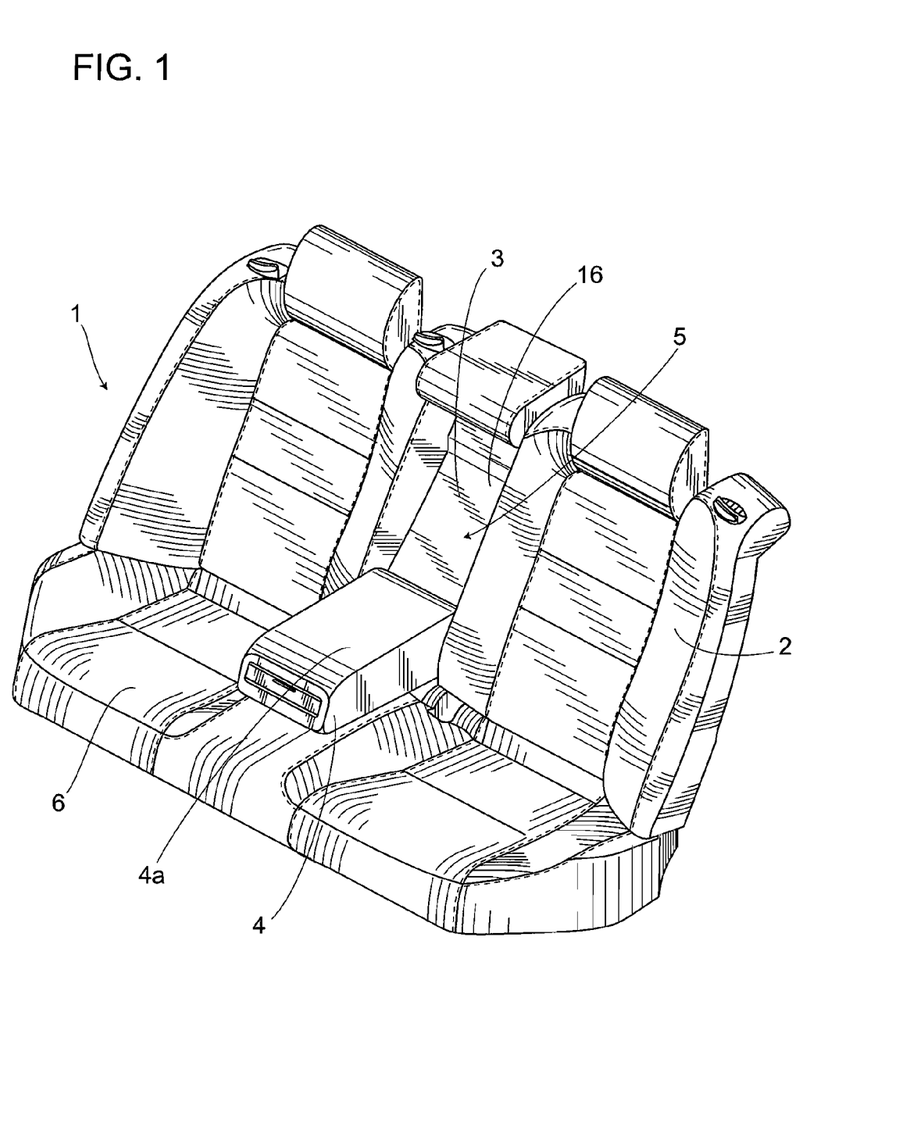
FIG. 1 is a perspective view illustrating an overall structure of a rear seat.

In FIG. 1, numeral symbol 1 denotes a vehicular rear seat as an overall view thereof. An opening is formed in a part of a section that is located substantially in the center of a seat back 2 to thereby form a trunk-through section 3, which is provided with an armrest 4 and a vehicular trunk-through openable and closable device 5. The armrest 4 is provided in a lower portion of the trunk-through section 3 in a freely rotatable manner such that it can be housed in the trunk-through section 3 in its standing condition while it can be folded forward onto a seat cushion 6.

Figure 2:
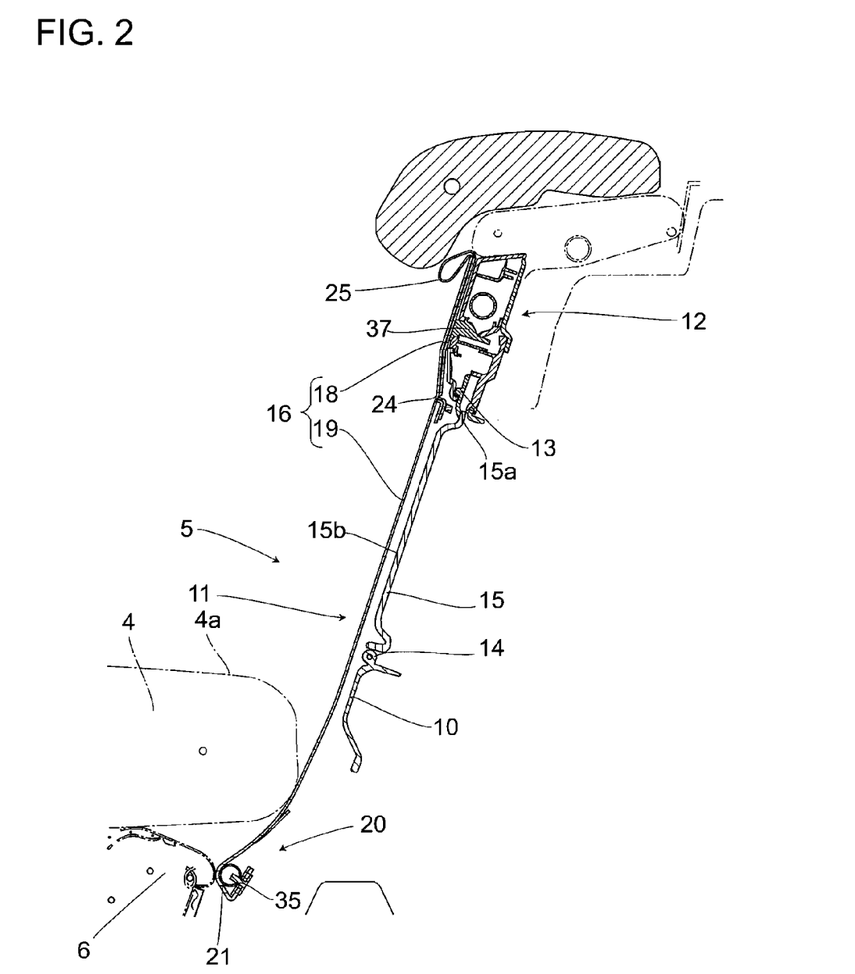
FIG. 2 is a cross-sectional view illustrating a sectional side structure of a vehicular trunk-through openable and closable device according to the present invention.

The vehicular trunk-through openable and closable device 5 comprises, as shown in FIG. 2, a frame member 10 fitted into a periphery of the trunk-through section 3, an opening and closing unit 11 provided in the frame member 10 in an openable and closable manner, and an unlocking unit 12 provided in an upper central portion of the frame member 10.

The opening and closing unit 11 can be folded forward onto an upper surface 4a of the armrest 4 in a forward-folded condition while it can be locked by a locking plate 13 of the unlocking unit 12 so as to be kept in its standing condition (hereunder, referred to as a closed condition). The opening and closing unit 11 comprises a tabular opening and closing plate 15 that is rotatably mounted on a lower end of an opening in the frame member 10 through a hinge 14; and an ornamental cover 16 provided on a front face of the opening and closing plate 15.

In a preferred form of the invention, the opening and closing unit 11 can be kept in the closed condition due to an upper end 15a of the opening and closing plate 15 abutting against the locking plate 13 of the unlocking unit 12, allowing the trunk-through section 3 to be closed. In the opening and closing unit 11, the ornamental cover 16 provided on the front face 15b of the opening and closing plate 15 covers the trunk-through section 3. When the armrest 4 has been folded forward with the opening and closing unit 11 kept in the closed condition, the ornamental cover 16 can be exposed.

Here, the ornamental cover 16 includes a cover upper portion 18 opposed to the unlocking unit 12 provided in an upper region and a cover main body 19 formed integrally with a lower end of the cover upper portion 18. A rotating section 20 provided in a lower end of the cover main body 19 is provided rotatably relative to a mounting support column 21 located behind the seat cushion 6.

Figure 3A:
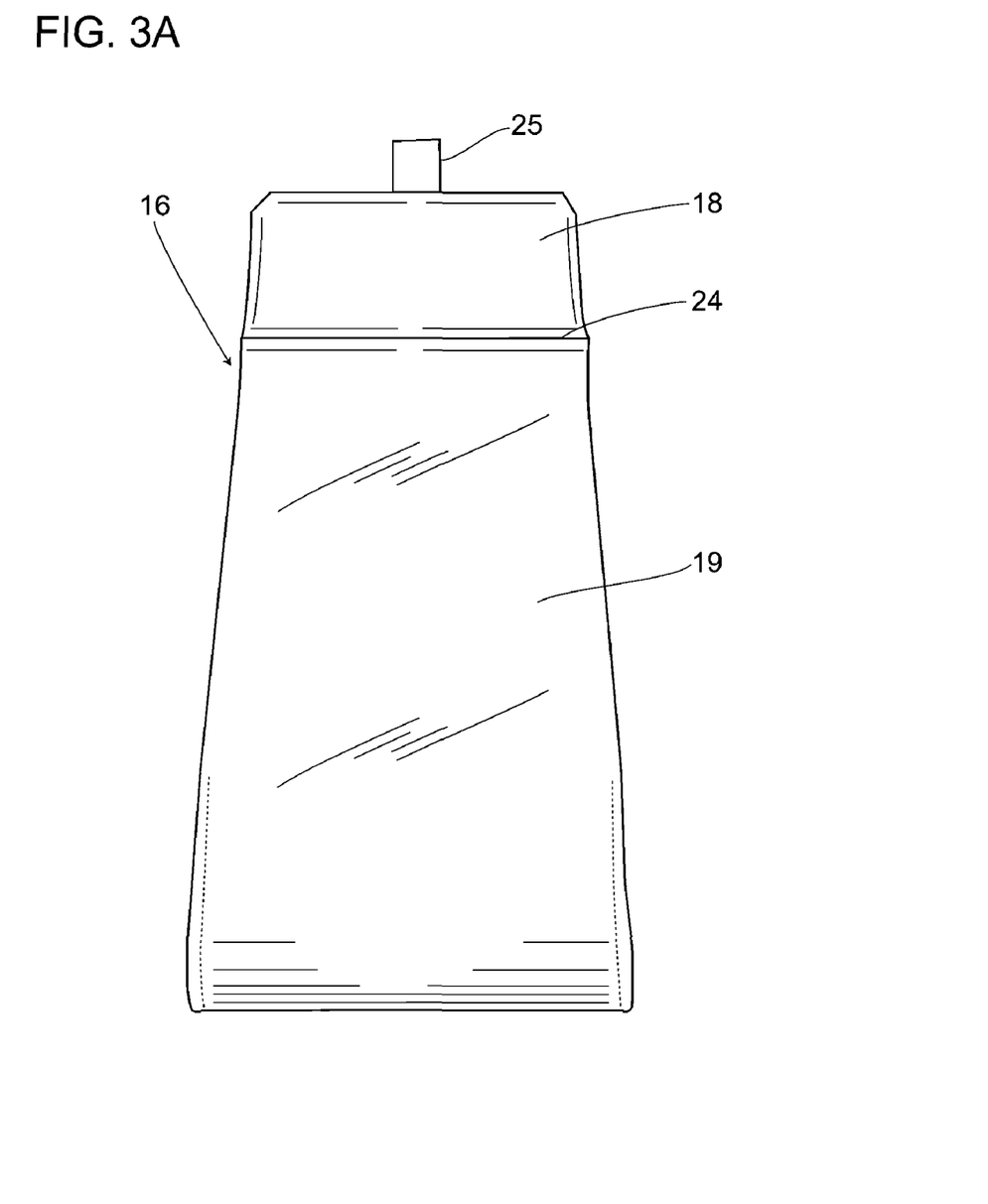
FIGS. 3A to 3C are schematic views each illustrating a structure of an ornamental cover.
Figure 4:
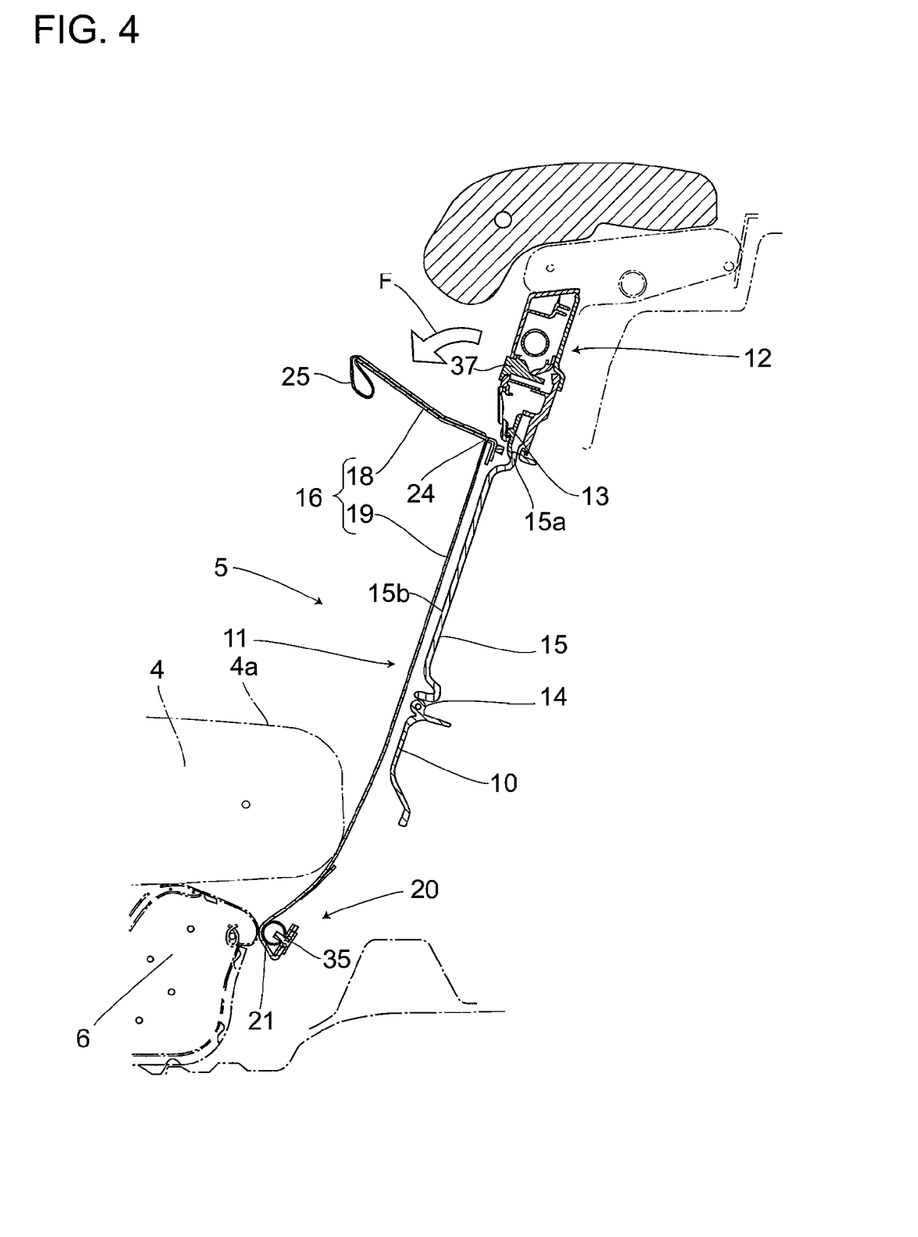
FIG. 4 is a schematic view illustrating a condition in which an upper portion of the ornamental cover has been folded forward.

The ornamental cover 16 is made of a leather member and is, as shown in FIG. 3 (A), formed in a substantially rectangular shape in conformity with a shape of the trunk-through section 3. Besides, the ornamental cover 16 is formed with a straight through concave portion 14 over both sides between the cover upper portion 18 and the cover main body 19. Then, a loop member 25 provided in an upper end of the cover upper portion 18 is pulled forward by user's hands, and thus, as shown in FIG. 4, only the cover upper portion 18 can be rotated in a forward-folding direction F with the concave portion 14 defined as a boundary. As a result, the ornamental cover 16 exposes only the unlocking unit 12 that had been blanketed by the cover upper portion 18 so that a user can operate the unlocking unit 12.

Figure 3B:
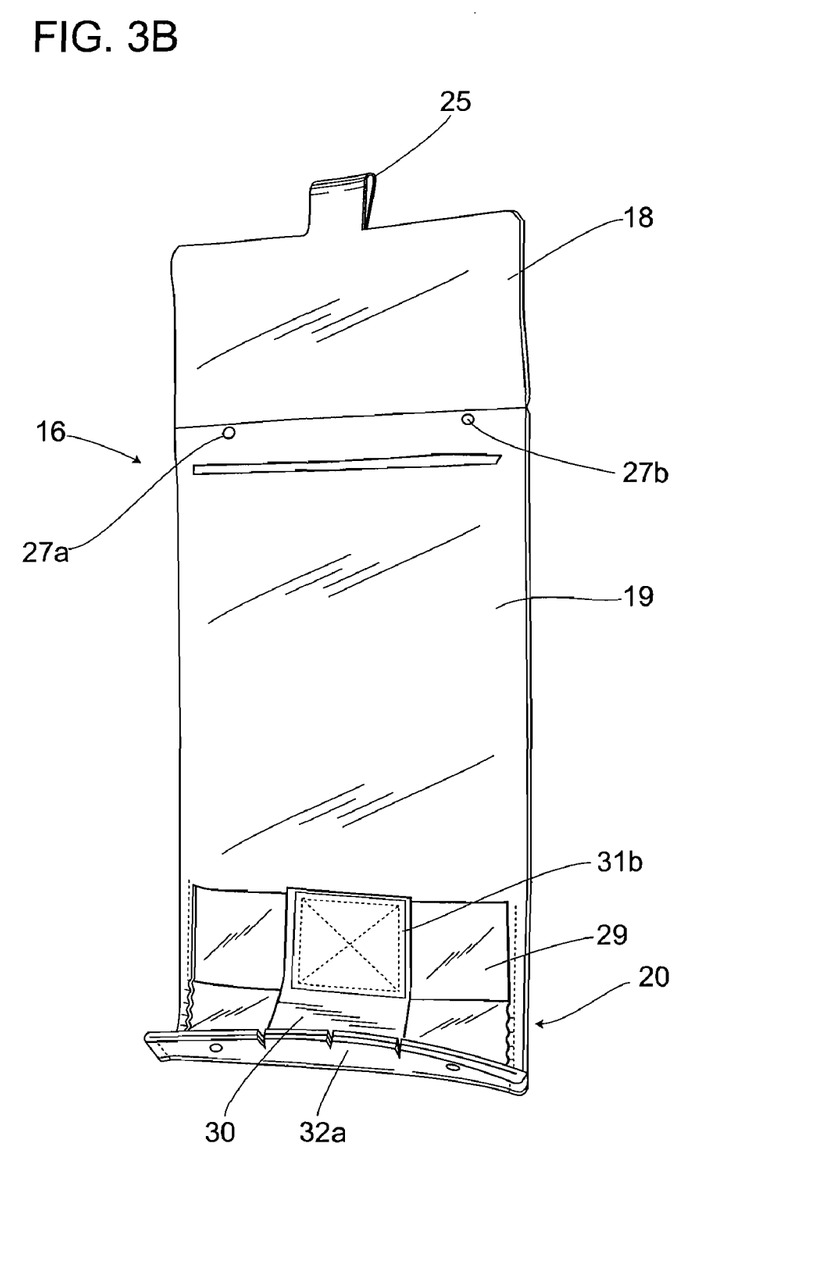
Figure 3C:
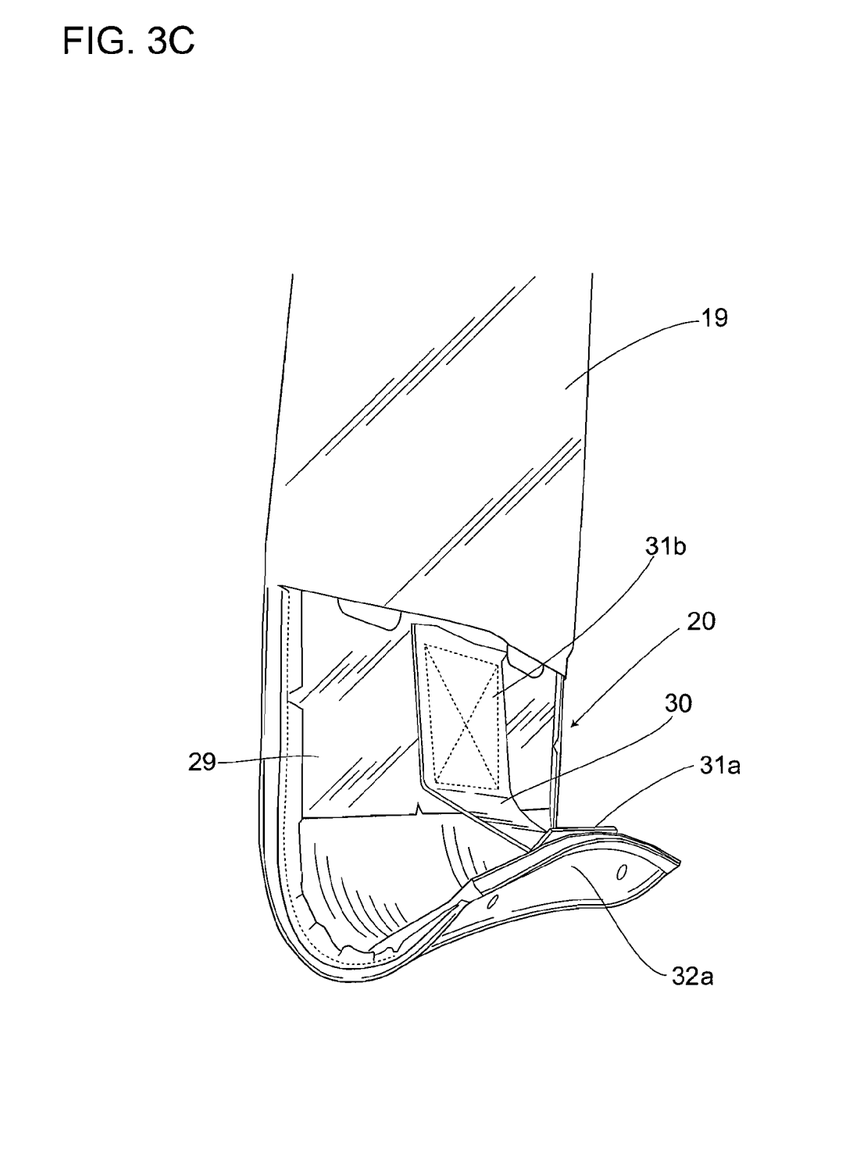

Further, on a rear side of the ornamental cover 16, as shown in FIG. 3 (B), screwing portions 27a, 27b are provided in two positions of an upper portion of the cover main body 19 so that an upper portion of the opening and closing unit 11 is fixed to the screwing portions 27a, 27b with tapping screws (not shown). The rotating section 20 of the cover main body 19 is, as shown in FIG. 3 (C), formed in a substantially U shape which is formed comparatively thin due to a liner member being removed. A thin and strip-shaped elastic member 30 is laid in a tensioned condition across opposed surfaces of the liner cloth member 29 exposed.

Figure 5:
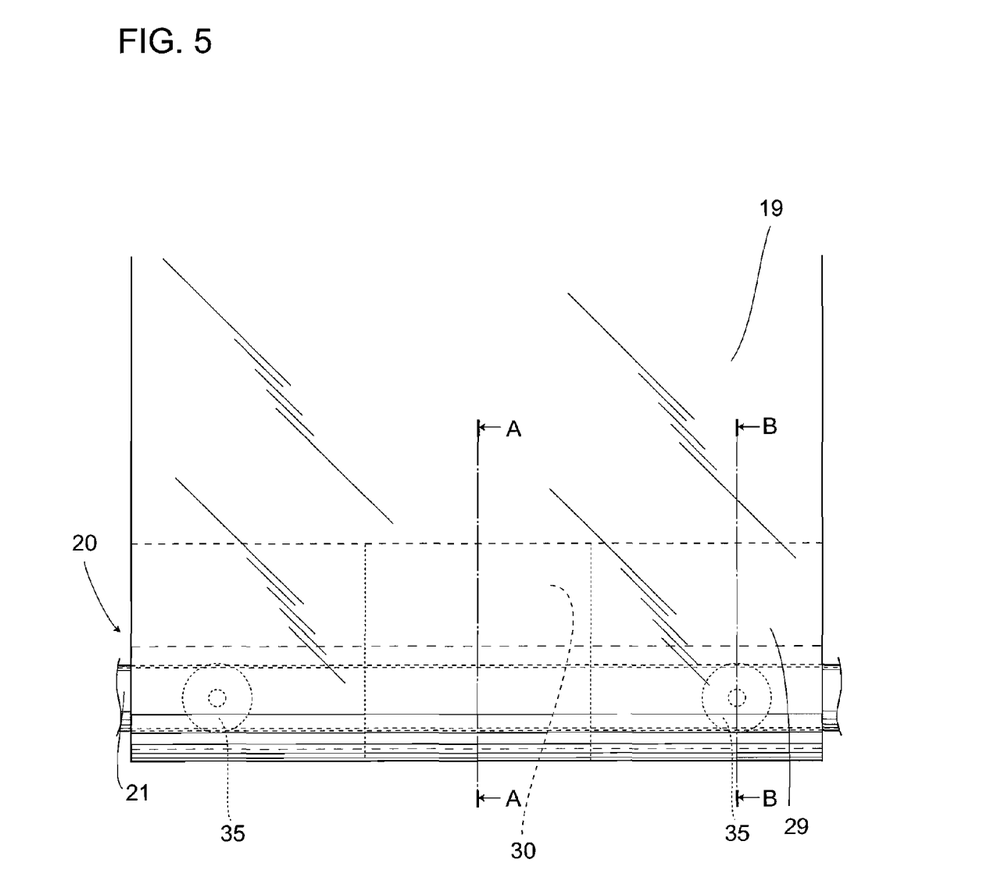
FIG. 5 is a schematic view illustrating a front structure when the ornamental cover has been attached to a mounting support column.
Figure 6:
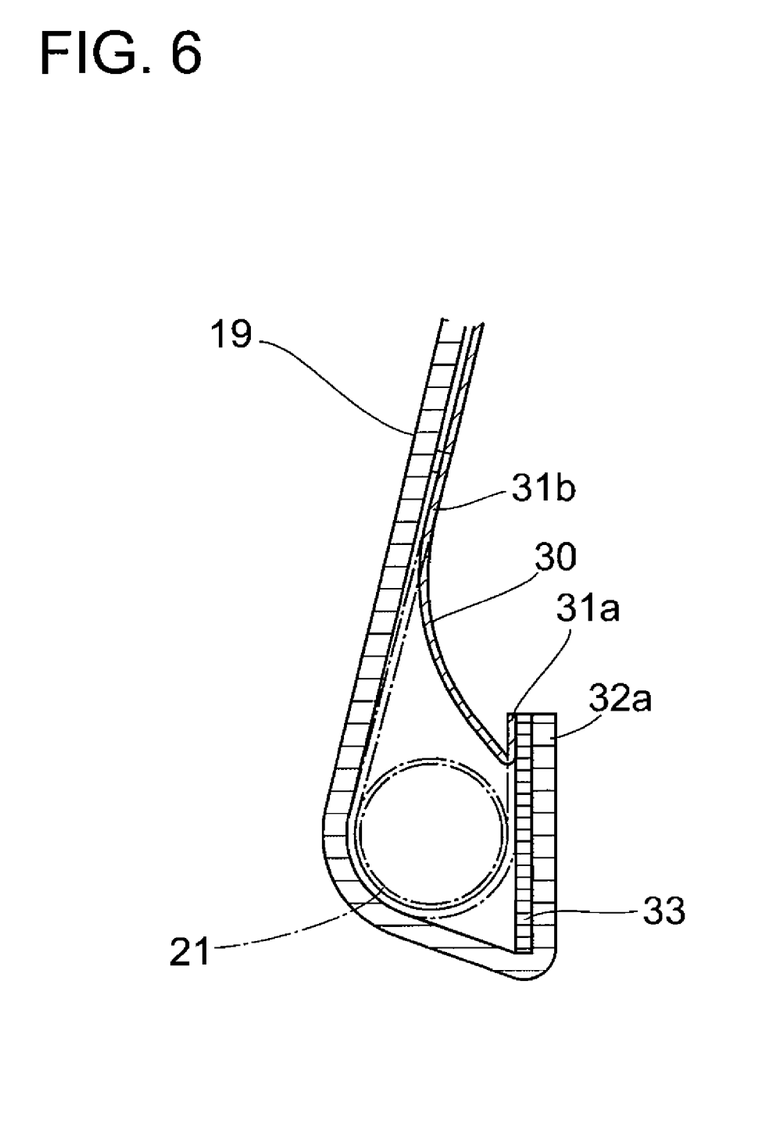
FIG. 6 is a cross-sectional view illustrating a structure of a rotating section prior to mounting the mounting support column thereon.

Specifically, the elastic member 30 is, as shown in FIG. 5, arranged in a substantially central position of the liner cloth member 29 of the cover main body 19. As shown in FIG. 6, one end 31a thereof is fixed to a distal end 32a folded or turned back, and besides the other end 31b is fixed to a surface opposed to the distal end 32a.

Alternatively, the turned-back distal end 32a may be, as shown in FIG. 6, provided with a plate 33 made of plastic and then the one end 31a of the elastic member 30 may be fixed to the plate 33. In this case, the distal end 32a can be prevented from being deformed and besides the one end 31a of the elastic member 30 can be attached closely to a plane of the plate 33, ensuring the both to be reliably fixed to each other.

Figure 7A:
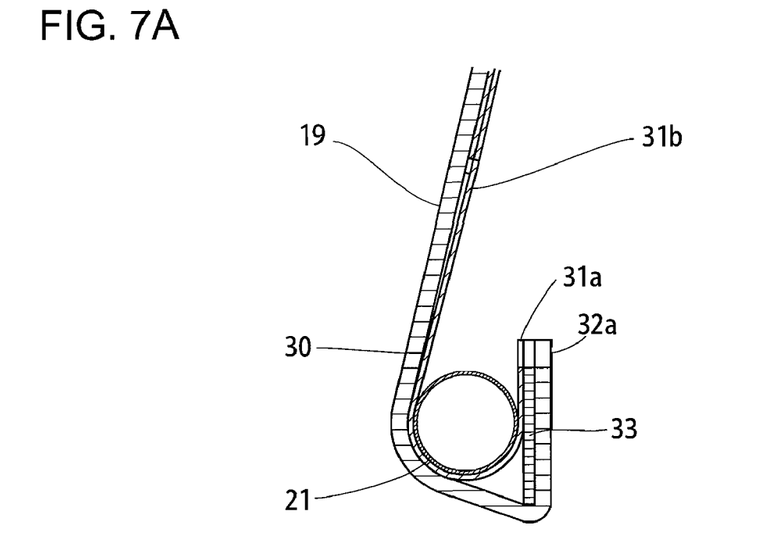
FIGS. 7A and 7B are cross-sectional views illustrating a condition when the mounting support column has been mounted on the rotating section.
Figure 7B:
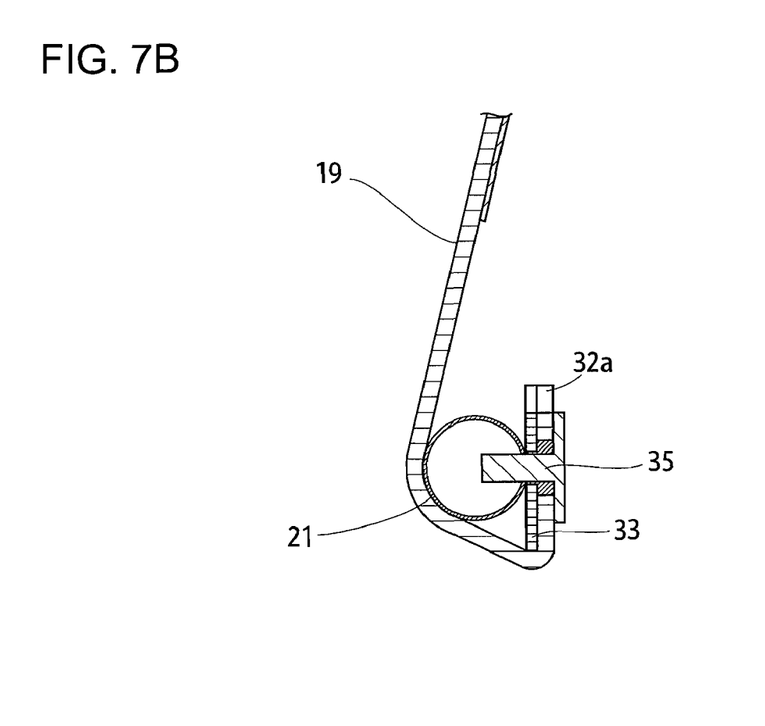
Figure 8:
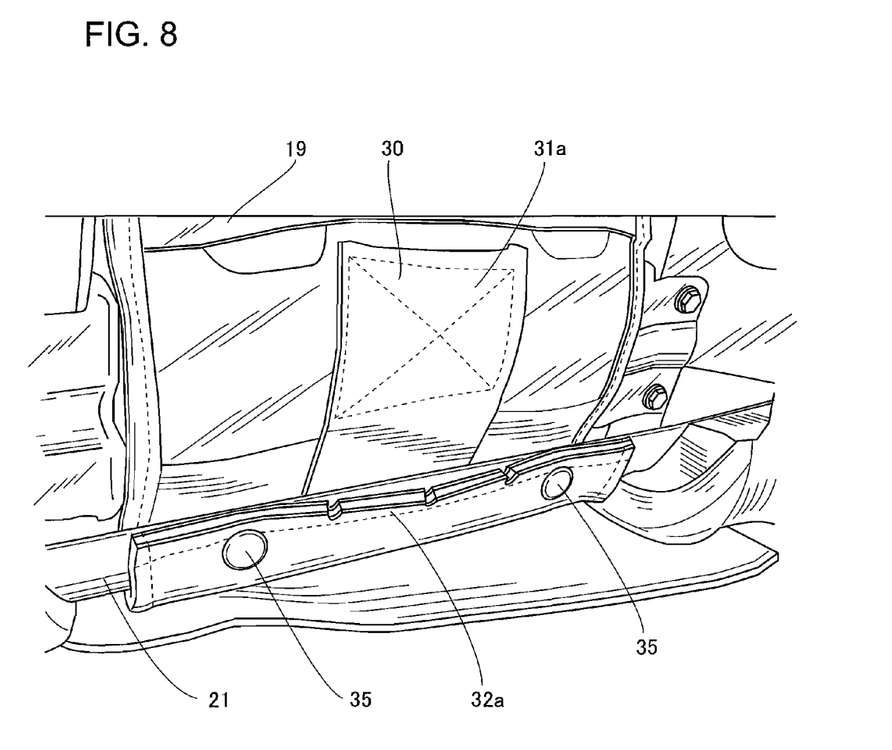
FIG. 8 is a perspective view illustrating a condition in which a distal end of the rotating section has been fixed to the mounting support column by fixing pins.

Referring to the rotating section 20, the column-shaped mounting support column 21, extending in the vehicular transverse direction is pushed into a space between the distal end 32a folded toward a rear side of the ornamental cover 16 in the opening and closing unit 11 and the surface opposed to the distal end 32a. Accordingly, as shown in FIG. 7 (A) representing a cross section taken on an A-A line of FIG. 5, the elastic member 30 can be extended in a tensioned condition by the mounting support column 21. As shown in FIG. 7 (B) representing a cross section taken on a B-B line in FIG. 5, the distal end 32a can be fixed to the mounting support column 21 by fixing pins 35 with such tensioned condition being kept.

Accordingly, when the opening and closing unit 11 has been rotated in a reverse direction (hereunder, referred to as a standing direction) relative to the forward-folding direction F to make the transition to the closed condition (see FIG. 2), the elastic member 30 is extended in a tensioned condition so as to wind around the mounting support column 21 to thereby yield an elastic force, which applies a rotating force toward the forward-folding direction F. As a result, at all times in the closed condition of the opening and closing unit 11, the rotating force is applied to the opening and closing unit 11 toward the forward-folding direction F or an opening direction.

Figure 9:
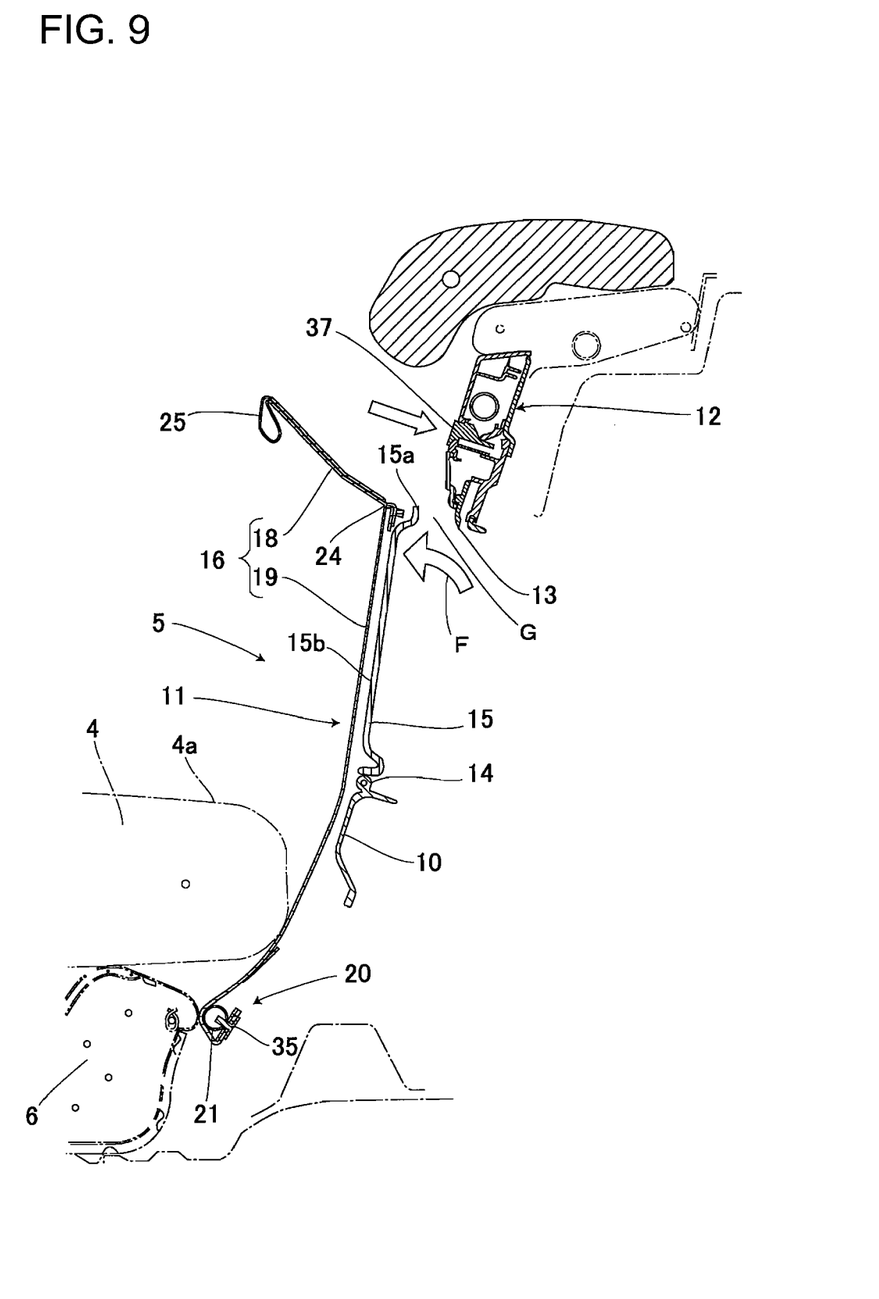
FIG. 9 is a perspective view illustrating a condition in which an opening and closing unit has been rotated after unlocking the opening and closing unit by an unlocking unit.

Here, the degree of the tensioning of the elastic member 30 caused by the mounting support column 21 is adjusted so that the rotating force toward the forward-folding direction F applied to the opening and closing unit 11 by the elastic force becomes slightly larger than a force working toward the standing direction applied by the own weight of the opening and closing unit 11. As a result, when the lock of the opening and closing unit 11 caused by the locking plate 13 has been released by the unlocking unit 12, the elastic member 30 turns the opening and closing unit 11 in the forward-folding direction F by the elastic force. Then, when the opening and closing unit 11 has been rotated up to a given angle, the own weight of the opening and closing unit 11 and the elastic force are well-balanced to thereby regulate the rotation degree of the opening and closing unit 11. In this way, the opening and closing unit 11 is folded forward by the elastic force. As shown in FIG. 9, however, the opening and closing unit 11 does not come in contact with the armrest 4 (hereunder, referred to as a fully open condition), thus allowing a slight gap G to be formed between the trunk-through section 3 and the opening and closing unit 11.

Incidentally, the unlocking unit 12 is constituted such that upon the pressing of a switch 37, an interlocking mechanism (not shown) functions to raise a lowermost part of the locking plate 13 up to a position where it does not contact an uppermost part 15a of the opening and closing plate 15, thus permitting the locked condition of the opening and closing plate 15 to be unlocked or released.

In this way, the opening and closing unit 11 with the lock of the opening and closing plate 15 being released is grasped with user's own hands to be folded forward, thereby making the transition to the fully open condition. As a result, the backward trunk room and the forehand vehicle interior are allowed to communicate with each other through the trunk-through section 3 and thus a long object can be taken in across the trunk room and the vehicle interior.

According to the vehicular trunk-through openable and closable device 5 of the foregoing structure, the opening and closing unit 11 is kept in a closed condition by the locking plate 13, whereby the elastic member 30 is extended in a tensioned condition so as to wind around the mounting support column 21, so that the force in the forward-folding direction F is applied to the opening and closing unit 11.

Further, according to the vehicular trunk-through openable and closable device 5, when the lock of the opening and closing unit 11 has been released by the unlocking unit 12, the opening and closing unit 11 is rotated in the forward-folding direction F by the elastic force of the elastic member 30 until the rotation thereof is regulated at a given angle without being forward folded down to the armrest 4, thus forming the slight gap G between the opening and closing unit 11 and the trunk-through section 3.

Accordingly, a user can check only with eyes whether the gap G has been formed between the opening and closing unit 11 and the trunk-through section 3, so that the instant judgment is possible about whether the lock of the opening and closing unit 11 has been unlocked by the unlocking unit 12.

Furthermore, according to the vehicular trunk-through openable and closable device 5, when the lock of the has been unlocked by the unlocking unit 12, only the slight gap G is allowed to be formed between the opening and closing unit 11 and the trunk-through section 3 without automatically folding the opening and closing unit 11 forward down to the armrest 4, and then, the opening and closing unit 11 is manually folded forward by user's own hands until it comes in contact with the armrest 4. Hence, in the vehicular trunk-through openable and closable device 5, the opening and closing unit 11 can be folded forward down to the armrest 4 at an timing desired by a user, according to a condition of use of the armrest 4 and user's own situation.

Moreover, according to the vehicular trunk-through openable and closable device 5, the opening and closing unit 11 is provided in the lower portion of the trunk-through section 3 in a freely rotatable manner and the elastic force is applied to the opening and closing unit 11 by the elastic member 30 in the forward-folding direction F. Hence, the slight gap G can be formed between the opening and closing unit 11 and the trunk-through section 3 in an upper region thereof, permitting a user making a visual inspection from above to easily check with eyes whether the gas G has been formed or not.

Besides, in the present embodiment, the thin and strip-shaped elastic member 30 is employed and is extended in a tensioned condition so as to wind around the mounting support column 21 and thus the elastic force is applied to the opening and closing unit 11 in the forward-folding direction F. Hence, a low-profiled form can be realized as the whole of the device, which can be thereby installed even at a space behind the rear seat, where an installation space is comparatively small.

According to the mechanism described above, when the lock of the opening and closing unit 11 has been unlocked by the unlocking unit 12, the opening and closing unit 11 is rotated in the forward-folding direction F by the elastic force caused by the elastic member 30 and thus the gap G is formed between the opening and closing unit 11 and the trunk-through section 3 without bringing the opening and closing unit 11 into the fully open condition. Hence, it can be visually checked whether the gap G has been formed between the opening and closing unit 11 and the trunk-through section 3 and thus it can be instantly determined whether the lock of the opening and closing unit 11 has been unlocked by the unlocking unit 12. Hence, the vehicular trunk-through openable and closable device 5 can be provided whose unlocked condition can be much more easily checked than has conventionally been done.

The present invention is not limited to the embodiment described above and various modifications are possible within the scope of the gist of the present invention. In the foregoing embodiment, it has been described that the strip-shaped elastic member 30 is used as an elastic member. The present invention, however, is not limited to the strip-shaped elastic member 30 but a thin sheet-like elastic member which has a rectangular shape, a circular shape or the like or various sorts of shapes other than these may be applied. Further, as a substitute for the sheet-like elastic member, a helical spring may be mounted on the mounting support column to apply a rotating force to the opening and closing unit 11 and furthermore various sorts of elastic members may be employed to apply the rotating force to the opening and closing unit 11.

Whilst in the foregoing embodiment, it has been discussed on the assumption that the forward-folding direction F applies to the opening direction in which the opening and closing unit 11 is rotated by the elastic force. In the present invention, however, various other directions such as rearward-folding direction, sideways-folding direction, etc. may be employed.

What is claimed is:

1. A vehicular trunk-through openable and closable device comprising:
   an opening and closing unit rotatably provided in a trunk-through section for allowing a trunk room and a vehicle interior to communicate with each other to open and close said trunk-through section;
   a locking unit for locking said opening and closing unit in a closed condition in said trunk-through section; and
   an unlocking unit for unlocking a locked condition caused by said locking unit,
   wherein said opening and closing unit is provided with an elastic member, said elastic member allowing said opening and closing unit to rotate in an opening direction by an elastic force thereof when said locked condition caused by said locking unit is unlocked by said unlocking unit, thus forming a gap between said opening and closing unit and said trunk-through section without bringing said opening and closing unit into a fully open condition.

2. The vehicular trunk-through openable and closable device according to claim 1, wherein said opening and closing unit includes a rotating section rotatably provided in a lower portion of said trunk-through section; said locking unit locks said opening and closing unit in a standing condition; and said elastic member applies said elastic force to said opening and closing unit in a forward-folding direction.

3. The vehicular trunk-through openable and closable device according to claim 2, wherein said elastic member is sheet-shaped so that said elastic member is extended in a tensioned condition so as to wind around a mounting support column provided in a given position when said opening and closing unit is in a closed condition, thereby applying said elastic force to said opening and closing unit in a forward-folding direction.

4. The vehicular trunk-through openable and closable device according to claim 3, wherein said mounting support column extends in a vehicular transverse direction and is pushed into a space between a turned-back end of said rotating section and a surface opposed thereto so that said elastic member is extended in a tensioned condition by said mounting support column while said turned-back end is fixed to said mounting support column with fixing pins.

5. The vehicular trunk-through openable and closable device according to claim 4, wherein a degree of tensioning caused by said mounting support column is adjusted in said elastic member so that a forward-folding rotating force applied to said opening and closing unit by said elastic force becomes slightly larger than a force applied toward a standing direction by an own weight of said opening and closing unit, and thus once said locked condition caused by said locking unit has been unlocked by said unlocking unit, said opening and closing unit is rotated in said forward-folding direction by said elastic force until said opening and closing unit has been rotated up to a given angle at which the own weight of said opening and closing unit and said elastic force are balanced to thereby regulate a rotating degree of said opening and closing unit.

* * * * *